Nov. 2, 1948.    B. H. DAULTON    2,453,000
METHODS OF MANUFACTURING AUGER BITS
Filed Sept. 17, 1946    2 Sheets-Sheet 1
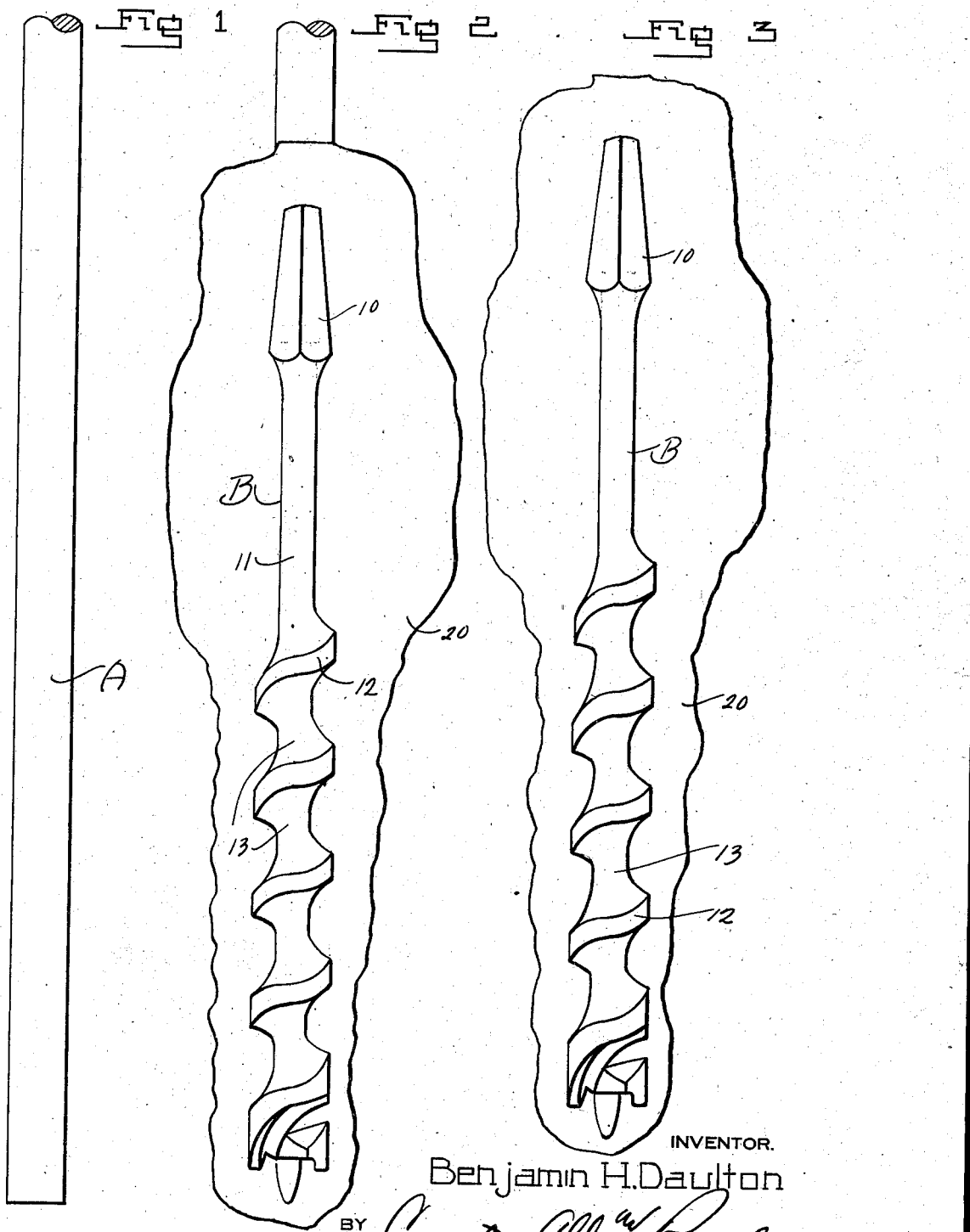
INVENTOR.
Benjamin H. Daulton
BY Lancaster, Allwein Rommel
ATTORNEYS.

Nov. 2, 1948.  B. H. DAULTON  2,453,000
METHODS OF MANUFACTURING AUGER BITS
Filed Sept. 17, 1946  2 Sheets-Sheet 2
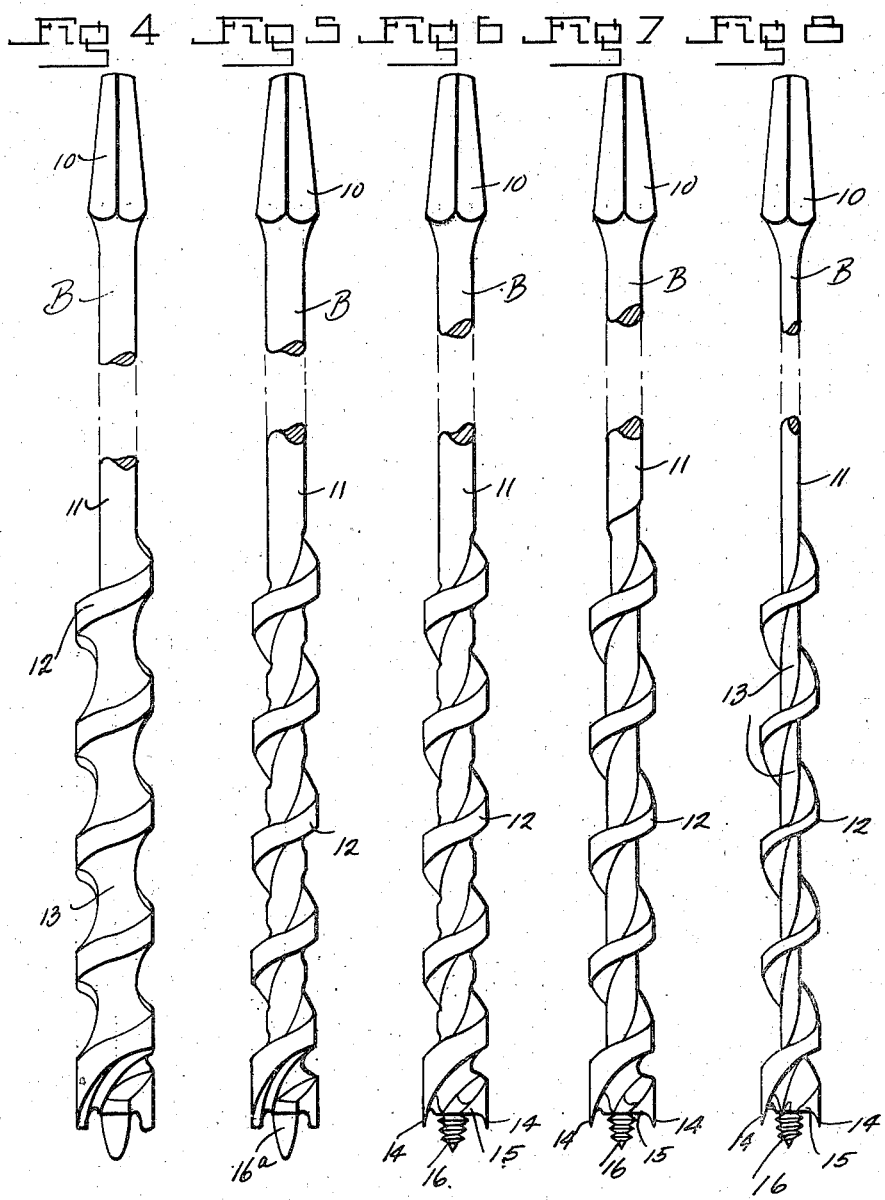
INVENTOR.
Benjamin H. Daulton Patented Nov. 2, 1948

2,453,000

UNITED STATES PATENT OFFICE 2,453,000

METHOD OF MANUFACTURING AUGER BITS

Benjamin H. Daulton, Wilmington, Ohio, assignor to The Irwin Auger Bit Company, Wilmington, Ohio, a corporation Application September 17, 1946, Serial No. 697,510

8 Claims. (Cl. 76—102)

This invention relates to improvements in manufacturing auger bits.

The primary object of this invention is the provision of an improved drop forging method for producing auger bits.

A further object of this invention is the provision of a drop forging process for the manufacture of uniformally constructed auger bits, the steps of which may be accomplished by relatively unskilled labor with a time saving factor over conventional auger bit manufacturing processes.

Other objects and advantages of the invention will be apparent from the following detailed description taken in connection with the accompanying drawings, forming a part of this specification, and in which drawings—

Figure 1 is a fragmentary view of a piece of round bar stock from which the bit is constructed.

Figure 2 shows the drop forging of an auger bit from a portion of the bar stock.

Figure 3 is a view similar to Figure 2 with the bar stock removed.

Figure 4 is a side elevation of the auger bit as drop forged, with the flash removed.

Figure 5 is a side elevation of the auger bit with the excess stock milled off.

Figure 6 is a view of the auger bit in a condition similar to that of Figure 5 but with the head of the bit machined and threaded ready for the heat treatment.

Figure 7 shows the auger bit with the spiral and stem rough ground after heat treatment of the head.

Figure 8 shows the finished bit.

In the drawings, wherein for the purpose of illustration is shown only a preferred embodiment of the invention, the letter A may generally designate a piece of round bar stock of any desired length from which successive bits are drop forged in the general rough condition shown in Figure 2.

For purposes of clarification, the finished auger bit shown at B in Figure 8 consists of a tang or nib 10, shank 11, spiral, crimp or twist 12, stem portions 13 between the convolutions of the spiral, spurs 14, lips or cutting edges 15 for the spurs, and the lead screw 16. Generally the entire lower portion of the auger bit including the spurs, lips, lead screw and a portion of the spiral may be referred to as the head.

It is present practice to manufacture auger bits by forging the shank and twist on a trip hammer, including a separate operation on the drop hammer or bulldozer to form the head. In some cases the twist portion of the bit has been forged flat on the trip hammer and then twisted to form the spiral. These operations require highly skilled operators and a much greater time is consumed in manufacturing auger bits compared to the drop forging process herein described. In conventional practice many rapid strokes of the trip hammer are required to form the shank and also the crimp or twist. In the trip hammer forming process a piece of round bar stock of the size required for one auger bit is selected and in the first operation the shank is forged on the trip hammer with a tang. The piece of steel is allowed to cool and the opposite end heated and the twist portion forged on a trip hammer equipped with the proper dies. In the next operation the head on the bit is formed on a drop forging operation and thereafter the head is trimmed and the parts of the bit subsequently ground, machined, heat treated and polished.

In the process of drop forging auger bits according to this invention, the round bar stock of a length which can be conveniently handled by the operator is heated at one end which is then placed between the forging dies. Such dies are formed to produce the entire bit in one operation, as shown in Figure 2. The dies are preferably provided with a "finish" cavity to form the bit outline as shown in Figure 2, but it is also preferable in the die parts to provide a cavity which will give a "fuller" impression in order to distribute the stock so that the "finish" impression may be filled with a minimum amount of stock. It is also preferable to have another die cavity to produce a "blocker" impression in which the bit is forged to the approximate shape before it is placed in the "finish" impression. The die parts may be made merely with a "finish" cavity, but the addition of the "fuller" and "blocker" impressions will enable the forging to be produced with a minimum amount of stock. The die life will be longer than if the drop forging is formed in a single "finish" impression. Of course the forging can be done on a drop hammer or forging press, as desired.

As shown in Figure 2, the parts 10, 11, 12 and 13, including the head parts, are formed with excess stock, complete in a single drop forging operation; the flash 20 being disposed in a plane intersecting the axis of the auger bit and surrounding the parts of the bit. It has a depth approximately 3/32". Note the excess stock which is provided upon the various parts of the bit in its general shape as formed in Figure 2. This is necessary to provide clearance for removing the work from the dies.

The heating of the bar stock for the forging operation may be done in any approved manner, and of course the steel or material is heated to the required forging temperature without excess scale.

Referring to Figure 3, as the next step the auger bit together with its flash may be removed from the piece of bar stock A shown in Figure 2 or the bar stock may remain at this point until after the trimming of the flash.

Referring to Figure 4 showing the flash trimmed from the auger bit part, it should be noted that the flash may be removed by either hot or cold trimming. The flash trimming operation is completed in a single operation upon a punch press wherein the dies are formed to proper contour to closely trim the flash from the forging. If a hot trimming process is used the forging is placed in the trimming press immediately after the forging operation, or a reheat may be made. To facilitate handling, the bar stock A may remain as a part of the drop forging during the trimming process and after the hot trimming of the flash has been accomplished the forging may be placed in the finishing impression of the forging die and restruck to insure a straight and true forging. Thereafter the bar stock A may be removed by shear blades on the punch press or cut-off on the die. Of course the bar stock A may then be replaced in the furnace for reheating of a sufficient portion to produce a second forging.

If a cold trimming process is used, the forging with flash attached is cut off at the bar as shown in Figure 3, and after the forging has cooled it is then placed in the die on a punch press and the flash removed in one operation. The forging may or may not be annealed prior to the cold trimming operation. Annealing will facilitate the trimming of the flash and improve the die life.

Subsequent to this operation of trimming the flash the spiral may be ground to size on its outside diameter, if so desired.

Referring to Figure 5, the excess stock of twist and a portion of the stem at the flash connection is removed by milling or broaching. This is accomplished by placing the forging in a holding fixture with locating points to properly position the bit endwise and radially. The fixture is secured to the milling machine so that the axis of the auger bit forging is at the proper angle (approximately 30°) with the machine auger on which the cutters are mounted. A series of form milling cutters are mounted on the auger with the proper spacing to remove the excess stock from each side of the spiral. This operation may also be done by broaching, using broaches made to the proper contour and with the proper holding fixture for the auger bit forging.

In Figure 5 showing the excess stock milled or broached off, the cone portion 16ª is properly machined.

Referring to Figure 6 the bit after removal of excess stock has its head end machined and ground prior to heat treating to complete the bit, spurs and lead screw. Thereafter the bit may be heat treated for hardening. After heat treatment the spiral and stem are rough ground, as shown in Figure 7, and thereafter the bit finished in the form shown in Figure 8 by machining and polishing.

It has been determined that after the forging and trimming operations above described, conventional machining, grinding and polishing operations may complete the auger bit.

Various changes in the steps of forming the auger bit may be made to the process herein described and departure in the form of the bit or article structure may be made without departing from the spirit of the invention or scope of the claims.

I claim:

1. The process of manufacturing an auger bit which consists in drop forging an auger bit in a single drop forging operation to provide a tang, shank, spiral and head, with excess stock attached to the spiral and head, removing the excess from the spiral and head, machining and providing upon the head spurs, lip and lead screw, and subsequently machining and finishing the auger bit shank and spiral.

2. The process of producing an auger bit which consists in die drop forging the auger bit in its general shape and full length of tang, shank, spiral and head with excess stock attached thereto in a single drop forging operation, taking a finishing impression of said auger bit in dies, removing the flash from the auger bit tang, shank, spiral and head in a single punching operation, subsequently removing the excess stock from the auger bit, and machining, heat treating and finishing the auger bit shank, spiral and head.

3. The step in the art of manufacturing auger bits which consists in drop forging an auger bit to its general contour of tang, shank, spiral and head from a piece of stock with flash attached thereto, hot trimming the flash from the tang, shank, spiral and head in a single punching operation, and subsequently finishing the auger bit.

4. The step in the art of manufacturing an auger bit which consists in selecting a piece of round bar stock of a length capable of manufacturing a plurality of auger bits therefrom, heating an end portion only of said bar stock, drop forging upon said heated end portion an auger bit in its full length and the general form of tang, shank, spiral and head with flash attached thereto, subsequently trimming said flash and remaining bar stock from said auger bit, and completing the formation of the auger bit.

5. The process of manufacturing auger bits which consists in selecting an elongated piece of bar metal capable of manufacturing a plurality of auger bits, heating an end portion of said bar metal, drop forging upon said heated end portion an auger bit to the general form of tang, shank, spiral and head with flash attached thereto, taking the auger bit as thus formed together with the bar stock and reheating the auger bit formed end, and when heated to the proper temperature trimming the bar stock and flash from the auger bit tang, shank, spiral and head in a single punching operation, and subsequently completing the auger bit.

6. The process of manufacturing auger bits which consists in selecting bar stock of a length capable of manufacturing a plurality of auger bits therefrom, heating an end of the stock, drop forging upon said heated end an auger bit in the general form of tang, shank, spiral and head together with flash attached thereto, punch trimming the flash from the auger bit tang, spiral and head in a hot trimming operation with the bar stock attached to the auger bit as formed, subsequently handling the auger bit through the bar stock end and placing it in a reshaping die, subsequently removing the bar stock from the auger bit and finishing the auger bit tang, shank, spiral and head.

7. The method of manufacturing an auger bit which consists in drop forging an auger bit to the general form of tang, shank, spiral and head with excess stock attached thereto including flash, trimming the flash, removing excess stock from the spiral and head, machine finishing the head to form lips, spurs and lead screw, heat treating the auger bit for hardening, and subsequently finishing the auger bit.

8. The process of manufacturing auger bits which consists in selecting metal round bar stock of a length capable of manufacturing a plurality of auger bits therefrom, heating one end portion of the stock of a length sufficient to make one auger bit, drop forging upon said heated end in dies a bit in full integral length with a full impression of tang, shank, spiral and head, spur, cone and lips together with flash attached thereto, removing the flash roughly from the auger bit, tang, spiral and head parts, removing the bar stock from the drop forging, spiral grinding the twist to external size, removing excess stock between spiral convolutions on the stem, machining and grinding the head, spurs, lips and cone, heat treating the drop forging for hardening, rough grinding the spiral and stem and machining and polishing the spiral and head, spurs and lips.

BENJAMIN H. DAULTON.

REFERENCES CITED

The following references are of record in the file of this patent:

UNITED STATES PATENTS

| Number | Name | Date |
|---|---|---|
| 378,408 | Thomas et al. | Feb. 21, 1888 |
| 412,957 | Irwin et al. | Oct. 15, 1889 |
| 419,622 | Bailey | Jan. 21, 1890 |
| 422,546 | Swan | Mar. 4, 1890 |
| 758,041 | Barclay | Apr. 26, 1904 |
| 1,407,794 | Lee et al. | Feb. 28, 1922 |
| 1,450,252 | Daulton et al. | Apr. 3, 1923 |
| 1,572,343 | Witherow | Feb. 9, 1926 |
| 1,618,791 | Witherow | Feb. 22, 1927 |
| 2,159,842 | Cook | May 23, 1939 |
| 2,310,675 | Boyce | Feb. 9, 1943 |